United States Patent [19]

Tsubouchi

[11] 4,059,086
[45] Nov. 22, 1977

[54] FUEL AND LUBRICATING OIL SUPPLY DEVICE

[75] Inventor: Haruyoshi Tsubouchi, Katsuta, Japan

[73] Assignee: Hitachi, Ltd., Japan

[21] Appl. No.: 654,753

[22] Filed: Feb. 3, 1976

[30] Foreign Application Priority Data

Mar. 5, 1975 Japan .................................. 50-25950

[51] Int. Cl.² ............................................... F01M 1/00
[52] U.S. Cl. ................................. 123/196 R; 123/8.45;
  123/73 AD; 123/122 AB; 123/127; 123/196 M; 418/100
[58] Field of Search .......... 123/8.45, 73 AD, 122 AB, 123/127, 196 M, 196 R; 418/100

[56] References Cited

U.S. PATENT DOCUMENTS

| 1,542,765 | 6/1925 | Garson | 123/196 R |
| 1,777,472 | 10/1930 | Mock et al. | 123/122 AB |
| 2,241,718 | 5/1941 | Meixsell | 418/100 |
| 2,273,202 | 2/1942 | Jackson | 123/73 AD |
| 3,804,201 | 4/1974 | Rombi et al. | 123/196 R |
| 3,868,929 | 3/1975 | Ishikawa | 123/73 AD |

Primary Examiner—Martin P. Schwadron
Assistant Examiner—G. L. Walton
Attorney, Agent, or Firm—Craig & Antonelli

[57] ABSTRACT

A fuel and lubricating oil supply device, wherein lubricating oil for lubricating the wall surfaces of a combustion chamber of an engine is fed to the engine, together with fuel. This fuel and lubricating oil supply device comprises; a device for heating an air-fuel mixture charge, which heating device is provided in an intake passage in which an air-fuel mixture charge is produced; and a lubricating oil supply portion open to the intake passage in the downstream of the heating device, whereby a change in quality or deterioration due to heat, of lubricating oil is prevented.

6 Claims, 3 Drawing Figures

FUEL AND LUBRICATING OIL SUPPLY DEVICE

BACKGROUND OF THE INVENTION

This invention relates to a fuel and lubricating oil supply device of the type, which has found a practical application to a rotary piston engine, and in which lubricating oil and fuel are both fed through an intake passage to a combustion chamber of the engine.

A fuel and lubricating oil supply device of the type of the prior art has been such that lubricating oil is injected through a metering pump into an intake passage on the upstream or downstream side of a throttle valve of a carburetor, and diffused into a mixture charge passing through the intake passage, thus being fed to a combustion chamber. In the meantime, as a countermeasure against exhaust gases and from the viewpoint of reduction of fuel consumption, there has recently arisen a demand for using a lean mixture charge. The use of a lean mixture charge however is accompanied by a problem of the failure in achieving smooth running of an engine. To solve the problem, it is desirable to provide a heating device in a bent portion of an intake passage connecting a fuel supply portion with a combustion chamber of the engine, which heating device consists of a heating plate which is so arranged as to be heated with such as exhaust gases, so that a mixture charge may be completely gasified, thus ensuring the smooth running of the engine.

However, with the fuel and lubricating oil supply device of the type in which fuel and lubricating oil are injected into the intake passage on the upstream of the heating device, lubricating oil and fuel are both subjected to heating. This impairs gasification of fuel as well as causes a change in quality due to heat, of lubricating oil, which leads to deterioration of lubricating oil. Furthermore, in the event of lubricating oil being stuck to the heating device in the carburetor, complete gasification of such lubricating oil is failed, with the resultant deposit of solid matters from the lubricating oil onto the heating plate. This enhances the premature failure in function of the heating plate.

SUMMARY OF THE INVENTION

It is accordingly an object of the present invention to provide a fuel and lubricating oil supply device, wherein complete gasification of fuel is ensured as well as a change in quality due to heat, of lubricating oil is prevented.

The feature of the device according to the present invention is that a carburetor is provided on the downstream side of a fuel supply portion, and a lubricating oil supply portion is provided on the downstream side of the carburetor, whereby fuel is gasified thoroughly and change in quality due to heat, of lubricating oil is prevented.

DESCRIPTION OF PREFERRED EMBODIMENTS

Figure 1:
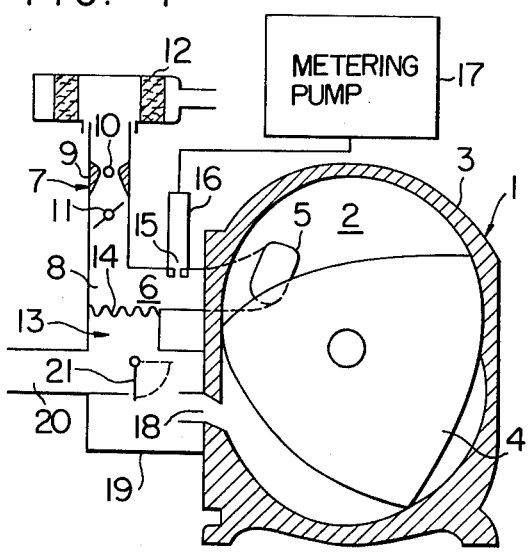
FIG. 1 shows the outline of a rotary piston engine, in which the present invention is embodied.

Referring to FIG. 1 which shows a rotary piston engine in which the present invention is embodied, there is shown at 1 a body proper of the rotary piston engine which comprises a casing 3 defining a combustion chamber 2, and a rotor 4 adapted to rotate within the casing. An intake port 5 is open from the wall of the casing in communication with the combustion chamber 2 and with an intake passage 6. Designated 7 is a carburetor, which comprises a venturi portion 9 provided in a mixing cylinder 8, a main fuel injection port 10 open to the venturi portion 9, and a throttle valve 11 disposed in the downstream of the venturi portion. The carburetor 7 is communicated at its top to an air cleaner 12 and, at its bottom, through the mediary of a heating device 13 with the intake port 5. The heating device consists of a heating plate 14 disposed in a bent portion of the intake passage, which is located on the downstream side of the throttle valve 11, and on which a mixture charge is to impinge.

A lubricating oil supply nozzle 15 is open to the intake passage 6 between the heating device 13 and the intake port 5, and communicated at the other end through a pipe 16 with a metering pump 17. An exhaust port 18 open from the wall of the engine casing 1 is communicated with an exhaust manifold 19, so that part of exhaust gases may be led along the under-surface of the heating plate 14 to an exhaust pipe 20. The quantity of exhaust gases flowing in the vicinity of the heating device is controlled by a control valve 21 which is so arranged as to be controlled by such as a heat-sensing member, so that the heating plate 14 may be controlled to a temperature optimum to gasification of fuel.

Figure 2:
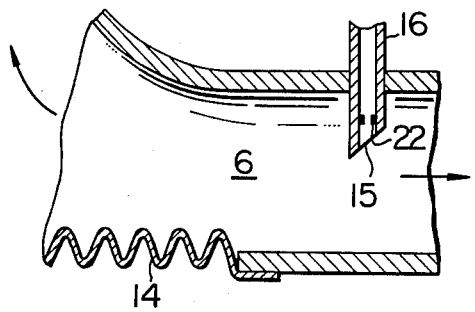
FIG. 2 is a longitudinal cross-sectional view of the essential part of FIG. 1.

FIG. 2 shows in detail the construction of the heating plate and lubricating oil injection nozzle. An orifice 22 is provided in the nozzle 15 in the vicinity of the lower end thereof, so as to increase lubricating-oil-injection pressure from the nozzle.

In operation of the device thus constructed, a mixture charge of a given air-fuel ratio is produced in the carburetor 7 and heated by the heating device 13. In case a gasoline engine is widely used, the optimum temperature of the heating plate 14 for facilitating gasification of fuel is on the order of 150° C, and the heating plate 14 is usually maintained at such an optimum temperature by the control valve 21 during the running of the engine.

Lubricating oil is injected in a given quantity from the metering pump 17, through the pipe 16 and eventually through the nozzle 15 into the intake passage 6 on the downstream side of the heating plate 14. In this device, lubricating oil is injected into the mixture charge heated to an elevated temperature, so that the lubricating oil is thoroughly diffused in the mixture charge, and on the other hand, lubricating oil becomes low in viscosity, when injected into the mixture charge, because the mixture charge has been sufficiently heated to an elevated temperature. Thus, the provision of the orifice 22 in the vicinity of the lower end of the nozzle 15 allows to set a lubricating oil injection pressure to a higher level, without incurring a metering error, while an increase in an injection pressure facilitates atomization of lubricating oil.

The lubricating oil thus injected into a mixture charge is introduced under pressure through the intake port 5 into the combustion chamber 2, so that there is no risk of lubricating oil contacting the heating plate 14, and hence adhering thereto, and thus lubricating oil is prevented from deterioration.

Figure 3:
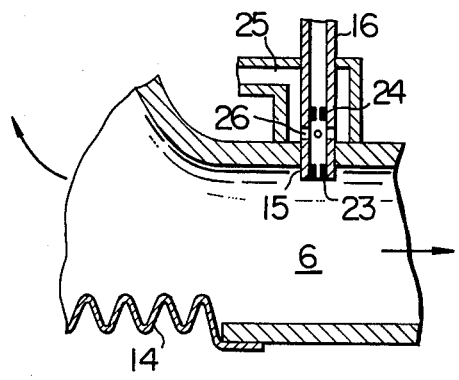
FIG. 3 is a longitudinal cross-sectional view of the essential part of a device of another embodiment.

FIG. 3 shows a longitudinal cross-sectional view of the essential part of the device of another embodiment. In this embodiment, with a view to providing an increased efficiency for atomization of lubricating oil, two orifices 23 and 24 are provided in the lubricating-oil-injection nozzle 15, and air from the air cleaner is introduced through an air passage 25 into the nozzle 15 between the both orifices. During the running of the engine, a vacuum or negative pressure is created in the intake passage 6, and air from the air cleaner is introduced through the air passage 25 and a through-hole 26 into the nozzle 15, then mixed with lubricating oil fed from the metering pump, and injected through the orifice 23 into the intake passage 6, and thus the atomizing characteristic of lubricating oil is improved. In this embodiment, as well, the nozzle 15 is located in the downstream of the heating plate 14, so that lubricating oil being injected from the nozzle into the intake passage is maintained out of contact with the heating plate, being free from deterioration, without hindering gasification of fuel, like the embodiment of FIG. 1. In the embodiment of FIG. 1, the carburetor 7 is shown as comprising a venturi portion, main injection port and throttle valve. The carburetor herein referred to may be of any type, so far as such a carburetor is capable of producing a mixture charge therein, for example, the so-called fuel injection type carburetor may be used, which comprises, in combination, a fuel injection nozzle and a throttle valve for controlling the flow rate of air. The device of the present invention is applicable to a carburetor of any type, if such a carburetor comprises a heating device for facilitating gasification of a mixture charge produced, and means for supplying lubricating oil through an intake passage to an engine.

In the embodiment, the heating device is shown as being heated with exhaust gases. However, an electrically heating plate may be used, alternatively.

The device according to the present invention may be applied to an engine of the type, such as a two-cycle engine, which is so constructed that fuel and lubricating oil are fed through an intake passage to an engine, although there is shown in the embodiments the case where the device is applied to a rotary piston engine.

What is claimed is:

1. In a fuel and lubricating oil supply device wherein lubricating oil for lubrication of the wall surfaces of a combustion chamber is fed, together with fuel, through an intake passage to said combustion chamber of an engine, the improvements comprising:
   heating means having a heating surface for gasifying fuel in a mixture charge provided midway in the intake passage through which a fuel and air mixture charge passes; and
   lubricating oil supply means for mixing lubricating oil with said fuel and air mixture charge, said lubricating oil supply means being provided in the downstream side of said heating surface so that the lubricating oil is supplied free from contact with said heating surface.

2. A fuel and lubricating oil supply device as defined in claim 1, wherein said lubricating oil supply means at least includes a metering pump, and a lubricating-oil-injection nozzle, said injection nozzle being provided with an orifice.

3. A fuel and lubricating oil supply device as defined in claim 2, wherein said injection nozzle is provided with an air passage for introducing air from an air cleaner to said injection nozzle, such that a mixture of lubricating oil and air is injected through said injection nozzle into said intake passage.

4. A fuel and lubricating oil supply device as defined in claim 3, wherein said injection nozzle includes: a small through-hole open into said nozzle for allowing introduction of air from said air passage into said nozzle; an orifice provided in said nozzle on the side of said metering pump with respect to said small through-hole; and another orifice provided in said nozzle on the exit side of said nozzle, said another orifice being open to said intake passage.

5. A fuel and lubricating oil supply device as defined in claim 1, wherein an injection nozzle constitutes the lubricating oil supply means, and is provided with an air passage for introducing air from an air cleaner to said injection nozzle, whereby a mixture of lubricating oil and air is injected through said injection nozzle into said intake passage.

6. In a fuel and lubricating oil supply device wherein lubricating oil for lubrication of the wall surfaces of a combustion chamber is fed, together with fuel, through an intake passage to said combustion chamber of an engine, the improvements comprising:
   a heating device for gasifying fuel in a mixture charge provided midway in the intake passage, through which a fuel and air mixture charge passes; and
   a lubricating oil supply device provided between said heating device and said combustion chamber, for supplying lubricating oil to said combustion chamber;
   wherein an injection nozzle constitutes the lubricating oil supply device, and is provided with an air passage for introducing air from an air cleaner to said injection nozzle, whereby a mixture of lubricating oil and air is injected through said injection nozzle into said intake passage; and
   wherein said injection nozzle includes: a small through-hole open into said nozzle for allowing introduction of air from said air passage into said nozzle; an orifice provided in said nozzle on the side of a metering pump with respect to said small through-hole; and another orifice provided in said nozzle on the exit side of said nozzle, which is open to said intake passage.

* * * * *